(12) United States Patent
Guo et al.

(10) Patent No.: US 11,808,848 B1
(45) Date of Patent: Nov. 7, 2023

(54) METHOD, SYSTEM AND TERMINAL FOR WIDE-AREA ACOUSTIC INDOOR POSITIONING BASED ON RF ENHANCEMENT

(71) Applicant: Zhejiang Deqing Zhilu Navigation Technology Co., LTD, Huzhou (CN)

(72) Inventors: Guangyi Guo, Huzhou (CN); Ruizhi Chen, Huzhou (CN); Feng Ye, Huzhou (CN)

(73) Assignee: Zhejiang Deqing Zhilu Navigation Technology Co., LTD, Huzhou (CN)

( * ) Notice: Subject to any disclaimer, the term of this patent is extended or adjusted under 35 U.S.C. 154(b) by 0 days.

(21) Appl. No.: 18/306,998

(22) Filed: Apr. 25, 2023

(30) Foreign Application Priority Data

Oct. 8, 2022   (CN) .......................... 202211222425.8

(51) Int. Cl.
| | | |
|---|---|---|
| *G01S 15/58* | (2006.01) | |
| *H04W 92/08* | (2009.01) | |
| *G01S 7/539* | (2006.01) | |
| *G01S 7/52* | (2006.01) | |

(52) U.S. Cl.
CPC ........ *G01S 15/582* (2013.01); *G01S 7/52079* (2013.01); *G01S 7/539* (2013.01); *H04W 92/08* (2013.01)

(58) Field of Classification Search
None
See application file for complete search history.

(56) References Cited

U.S. PATENT DOCUMENTS

| | | | |
|---|---|---|---|
| 2003/0144010 A1* | 7/2003 | Dollinger | G01S 13/755 455/456.2 |
| 2010/0250170 A1* | 9/2010 | Kalinin | B60C 23/0433 702/179 |
| 2018/0261084 A1* | 9/2018 | Tsai | G01K 1/024 |
| 2018/0288016 A1* | 10/2018 | Stein | H04W 12/06 |
| 2020/0294401 A1* | 9/2020 | Kerecsen | G05D 1/0287 |
| 2021/0356279 A1* | 11/2021 | Szigeti | G01C 21/3407 |

FOREIGN PATENT DOCUMENTS

| | | |
|---|---|---|
| CN | 103347297 A | 10/2013 |
| CN | 104535962 A | 4/2015 |
| CN | 106793072 A | 5/2017 |

* cited by examiner

*Primary Examiner* — Daniel L Murphy
*Assistant Examiner* — Amie M Ndure
(74) *Attorney, Agent, or Firm* — Nitin Kaushik

(57) ABSTRACT

The present disclosure belongs to technical field of indoor positioning, and discloses a method and system for wide-area acoustic indoor positioning based on RF enhancement, comprising: design of an acoustic signal, using Blackman window function to control the amplitude of acoustic signal entering and leaving channel; a mixed multiple access transmission of the acoustic signal, combining three multiple access schemes of time, space and frequency, assisting a small amount of BLE signals, and constructing a wide-area coverage capability of the acoustic positioning signal; acoustic measurement based on RF enhancement, including TOA estimation of an acoustic signal and area identification based on low-power Bluetooth RSS; robust fusion positioning of an inertial sensor and multi-source measurement, including pedestrian walking speed estimation, multi-source heterogeneous measurement, acoustic measurement compensation and correction, measurement quality evaluation and control.

6 Claims, 11 Drawing Sheets

METHOD, SYSTEM AND TERMINAL FOR WIDE-AREA ACOUSTIC INDOOR POSITIONING BASED ON RF ENHANCEMENT

CROSS-REFERENCE TO RELATED APPLICATIONS

The application claims priority to Chinese patent application No. 2022112224258, filed on Oct. 8, 2022, the entire contents of which are incorporated herein by reference.

TECHNICAL FIELD

The present disclosure is in the field of indoor positioning technology, and particularly relates to a method, system and terminal for wide-area acoustic indoor positioning based on radio frequency (RF) enhancement.

BACKGROUND

At present, traditional indoor positioning technologies such as Wi-Fi fingerprint matching, pedestrian dead reckoning, bluetooth iBeacon positioning and geomagnetic matching have been slowly fading out of the research field. With the market demand and promotion of IT giants such as Google, apple and Baidu, high-precision indoor positioning technology has been developed rapidly during the 13th five-year period, which is the mainstream of indoor positioning research. These technologies include Google's Wi-Fi RTT (Round-Trip-Time) ranging technology and Apple's Ultra Wide Band (UWB) positioning technology. In addition, high-precision indoor positioning technologies developed in recent years include acoustic positioning technology, 5G positioning technology, pseudo-satellite positioning technology, Bluetooth angle measurement technology and visual positioning technology, etc.

The acoustic positioning technology is a positioning technology for calculating the distance between the transmitter and the receiver by measuring the acoustic propagation time, and the working mode thereof is the same as the GNSS positioning, in both cases being a broadcast mode. With the characteristics of low cost, high precision and good compatibility, it provides a new possibility for indoor positioning based on smart phones of a consumer grade. Acoustic positioning technology can use the built-in microphone of smart phone to achieve high-precision positioning without changing existing mobile phone hardware.

Intelligent mobile phone indoor positioning technology based on acoustic signals has the characteristics of low cost, high accuracy and good compatibility, but in the limited acoustic bandwidth of intelligent devices, to identify and distinguish enough acoustic signals is the key technology to achieve wide-area coverage of acoustic positioning signals. Existing acoustic positioning systems, such as: the Criket system proposed by the Massachusetts Institute of Technology in 2000 combines electromagnetic waves and ultrasound to jointly estimate the time of arrival of ultrasound for positioning, which limits the number of access users. The research team of Nanjing University of Posts and Telecommunications has optimized the BeepBeep system and proposed the oneBeep system. The Guoguo system proposed by the team of San Jose State University adopts the broadcast architecture of code division multiple access (CDMA), and uses the orthogonal code modulation technique to estimate the time of arrival of the signal directly.

| System | Time | Unit | Test Site | Precision | Roaming | Multi-user | Cost | Support mobile phone |
|---|---|---|---|---|---|---|---|---|
| Beep | Year 2005 | US/University of California | 9.8 m × 5.5 m | Centimeter | Supported | Limited | High | Not supported |
| BeepBeep | Year 2007 | US/Purdue University | 1.8 m × 1.6 m | Centimeter | — | Limited | High | Difficult |
| ALPS | Year 2015 | US/Carnegie Mellon University | 15 m × 8 m | Decimeter | — | Infinite | Medium | Not supported |
| Guoguo | Year 2016 | US/San Jose State University | 2 m × 8 m | Decimeter | — | Infinite | Medium | Supported |
| AALTS | Year 2019 | CN/Huazhong University of Science and Technology | 8 m × 12 m | Sub-meter | — | Limited | High | Supported |

Through the foregoing analysis, the problems and defects of the prior art are as follows.

(1) Existing solutions and systems can achieve room-level positioning coverage, but it is difficult to meet the large-scale, multi-area indoor positioning requirements.

(2) The propagation speed of acoustic signals is slow and it is not possible to obtain statistical results from multiple measurements over a short period of time like RF signals, or to achieve accurate ranging through the interaction of a transmitter and a receiver. Thus, in a complex indoor multipath environment, the detection of the acoustic signal directly affects the accuracy of the positioning system.

(3) The frequency bands available on smartphones for positioning are very limited. In addition, factors such as signal-to-noise ratio (SNR), doppler-induced frequency shifts, and sampling make it difficult to recognize acoustic signals over long distances.

(4) Non-NLOS introduces measurement errors in acoustic signal ranging, which greatly affects the accuracy of positioning.

SUMMARY

In view of the problems existing in the prior art, the present disclosure provides a wide-area indoor positioning method, system and terminal using acoustic signal based on RF enhancement.

The present disclosure is realized via a method for wide-area acoustic indoor positioning based on RF enhancement, which comprises:
- step 1, design of an acoustic signal;
- step 2, hybrid multiple access transmission of an acoustic signal;
- step 3, acoustic measurement based on RF enhancement;
- step 4, robust fusion positioning of an inertial sensor and multi-source measurement.

Further, the frequency $f_0$ of the acoustic signal of step 1 is selected in the range of 12 kHz~23 kHz, and the expression is:

$$s(t) = e^{j2\pi\left(f_0 t + \frac{1}{2}k_0 t^2\right)}, t \in [0, T]$$

the modulation rate $k_0$ and the signal period T being respectively set as 100 kHz/s and 50 ms;

furthermore, in order to reduce effect of the microphone diaphragm inertia, a Blackman window function being used to control an amplitude of an acoustic signal entering and leaving a channel, the expression of the Blackman window function being:

$$w(a) = \begin{cases} 0.42 - 0.5\cos\left(\frac{2\pi}{M-1}\right) + 0.08\cos\left(\frac{4\pi a}{M-1}\right), & 0 \le a \le M-1 \\ 0, & \text{other conditions} \end{cases}$$

a denoting a number of samples and M denoting a window length.

Further, the hybrid multiple access transmission of step two identifies and distinguishes enough acoustic signals from the acoustic signal level and the overall system level using limited acoustic bandwidth. Combining three multiple access schemes of time, space and frequency, assisting a small amount of Bluetooth Low Energy (BLE) signals, and constructing a wide-area coverage capability of an acoustic positioning signal comprise:
- (1.1) based on the acoustic broadcasting frameworks of Time division Multiple Access (TDMA) and Frequency division Multiple Access (FDMA), realizing an independent acoustic positioning unit by alternately broadcasting signals of different frequency bands in time;
- (1.2) on the basis of joint calculation of the time of arrival and encoding/decoding of an acoustic signal, implementing broadcasting frameworks of TDMA and FDMA, and a reproducible positioning unit array being formed by a plurality of acoustic positioning units;
- (1.3) with spacial isolation and in combination with BLE signal, realizing the expansion of unit array, and constructing the broadcasting frameworks of TDMA, FDMA and Spatial division Multiple Access (SDMA), so as to realize wide-area coverage.

Further, the FDMA sets two independent frequency bands and a specific guard frequency interval, and allocates a respective working frequency band to each acoustic base station;

the TDMA uses acoustic base stations of the same frequency band to perform time sharing in a non-overlapping interval;

the guard interval time and period are determined by a coverage area;

the SDMA performs multiplexing by spatially separating identical acoustic base stations, and distinguishes same by the acoustic base stations broadcasting Bluetooth information.

Further, the acoustic measurement based on RF enhancement of step 3 comprises a TOA estimation of an acoustic signal and area identification based on low-power Bluetooth Received Signal strength (RSS).

Further, the TOA estimation of the acoustic signal comprises:
- (2.1) presence detection;
- (2.2) fine time measurement;

and step (2.1) specifically comprises that:
- (2.1.1) a local spectrum of s(t) is calculated by adding a window function $\gamma(t)$ to a signal in a time domain.

$$STFT_s(t, f) = \int_{-\infty}^{\infty} [s(t')\gamma^*(t'-t)]\exp(-j2\pi f t')dt'$$

(2.1.2) the time-frequency matrix $\Psi(F, T)$ being rotated by angle $\theta = \arctan(k_0)$, and the transformed time-frequency matrix $\Psi_\theta(F', T')$ is expressed as:

$\Psi_\theta(F', T') = T_\theta \times \Psi(F, T)$ (2.1.3) the statistical magnitude $\Pi(F'_n)$ of energy accumulation is expressed as:

$\Pi(F'_n) = \Sigma_{(n,m)} \Psi_\theta(F'_n, T'_m)$ $\Psi_\theta(F'_n, T'_m)$ representing the transformed time-frequency matrix of n rows and m columns.

According to the threshold method, an existence time of acoustic signal is detected:

$$\begin{cases} \Delta\Pi(F'_n) < \min(\Delta\Pi(F'_{n-1}), \Delta\Pi(F'_{n+1})) \\ |\Delta\Pi(F'_n)| \ge \gamma_{\Delta\Pi} \end{cases}$$

$\Delta\Pi(F'_n)$ representing a change of $\Pi(F'_n)$, Yan representing a detection threshold, $\Delta\Pi(F'_{n-1})$ representing a change of $\Pi(F'_{n-1})$, and $\Delta\Pi(F'_{n+1})$ representing a change of $\Pi(F'_{n+1})$.

(2.1.4) The time of arrival $\hat{\tau}_p$ of the signal is obtained by inverse rotation transformation of the angle $\theta$.

Step (2.2) specifically comprises that:
- (2.2.1) the filtered acoustic signal $x'_p(t)$ is obtained according to the time of arrival $\hat{\tau}p$ of the signal, and the cross-correlation (CC) with the reference signal s(t) is calculated:

$r_{xs}(\tau) = E[x'_p(t)s(t)]$ (2.2.2) a maximum value of CC function $r_{xs}(c)$ is taken as an initial time, and a first peak is inversely searched according to the threshold method with the following expression:

$\hat{\tau}_0 = \min\{|r_{xs}(\hat{\tau}_n)| \ge \alpha \max[|r_{xs}(\tau)|]\}$ wherein $\alpha$ represents a threshold coefficient and $\alpha = 0.3$ is taken.

Further, the area identification based on low-power Bluetooth RSS comprises:

utilizing the Bluetooth signal broadcast by a Bluetooth module carried by an acoustic base station deployed by each unit in a unit array to distinguish the unit array, and based on a spatial distribution and a propagation rule of the Bluetooth RF signal, establishing a weighting matrix of a Bluetooth update frequency and a signal strength:

$$\prod(r) = \frac{1}{\eta}\begin{bmatrix} \eta_{1,1}(\hat{\gamma}_{1,1}-\gamma) & \eta_{1,2}(\hat{\gamma}_{1,2}-\gamma) & \cdots & \eta_{1,m}(\hat{\gamma}_{1,m}-\gamma) \\ \eta_{2,1}(\hat{\gamma}_{2,1}-\gamma) & \eta_{2,2}(\hat{\gamma}_{2,2}-\gamma) & \cdots & \eta_{2,m}(\hat{\gamma}_{2,m}-\gamma) \\ \vdots & \vdots & \cdots & \vdots \\ \eta_{n,m}(\hat{\gamma}_{n,1}-\gamma) & \eta_{n,m}(\hat{\gamma}_{n,2}-\gamma) & \cdots & \eta_{n,m}(\hat{\gamma}_{n,m}-\gamma) \end{bmatrix}$$

where $\eta_{n,m}$ represents the number of RF signals scanned by each unit, $\eta$ is a total number of RF signals scanned at the current moment, $\gamma_{n,m}$ is an average value of RSS in a sliding window, and $\gamma$ is a system configuration parameter (the recommended setting is 100-120).

The corresponding unit array with the highest comprehensive weighted value R is calculated to distinguish the current area:

$$R = \arg\max(\Pi(r))$$

Further, the robust fusion positioning of the inertial sensor and multi-source measurement of step 4 comprises: pedestrian walking speed estimation, multi-source heterogeneous measurement, acoustic measurement compensation and correction, measurement quality evaluation and control.

Further, the pedestrian walking speed estimation includes that: the two-dimensional pedestrian walking speed is estimated by interpolating relative step frequency points, and the pedestrian walking speed estimation is expressed as follows:

$$\begin{cases} v_{x,k} = SL_k \cdot SF_k \cdot \cos\left(\Psi_{k-1} + \frac{1}{2}\Delta\Psi_k\right) \\ v_{y,k} = SL_k \cdot SF_k \cdot \sin\left(\Psi_{k-1} + \frac{1}{2}\Delta\Psi_k\right) \end{cases}$$

where $SL_k$ and $SF_k$ denote the step size and the step frequency at step k, respectively, and $\Psi_k$ and $\Delta\Psi_k$ denote heading (azimuth) and the change in heading, respectively.

Further, the multi-source heterogeneous measurement comprises that:

(3.2.1) the double base station TDOA measurement expression $z_k^{TDOA}$ is as follows.

$$z_k^{TDOA} = [c \times TDOA_{i,j}]^T = [c \times (TOA_i^R - TOA_j^R + (i-j)*\Gamma)]^T, i \le j$$

wherein c represents a propagation speed of an acoustic signal, R represents a current area, $\Gamma$ represents a guard time, i represents a base station of no. i, and j represents a base station of no. j.

By using Taylor extension and ignoring higher order errors, the acoustic TDOA measurement model is shown as:

$$H_k^{TDOA} = \left[\frac{E_L - e_k}{\|r_L - \hat{x}_k\|} - \frac{E_{L-1} - e_k}{\|r_{L-1} - \hat{x}_k\|} \quad \frac{N_L - n_k}{\|r_L - \hat{x}_k\|} - \frac{N_{L-1} - n_k}{\|r_{L-1} - \hat{x}_k\|} \quad \frac{U_L - u_k}{\|r_L - \hat{x}_k\|} - \frac{U_{L-1} - u_k}{\|r_{L-1} - \hat{x}_k\|} \quad 0\right]$$

wherein $r_L = [E_L\ N_L\ U_L]$ represents a position vector of the Lth base station, $r_{L-1} = [E_{L-1}\ N_{L-1}\ U_{L-1}]$ represents a position vector of the (L−1)th base station, and $P_k = [e_k\ n_k\ u_k]$ represents a position predicted by the system in the epoch k;

(3.2.2) a single base station relative ranging expression $z_k^{RR}$ is as follows:

$$z_k^{RR} = [c \times (TOA_k^L - TOA_{k-1}^L - 0) + \|r_L - \hat{x}_{k-1}\|]^T$$

where $\theta$ is the period of the TDMA, determined by the coverage area, and the present disclosure takes $\theta = 1000$ ms.

Similarly, the measurement model for single base station relative ranging is shown as:

$$H_k^{RT} = \left[\frac{E_L - e_k}{\|r_L - p_k\|} \quad \frac{N_L - n_k}{\|r_L - p_k\|} \quad \frac{U_L - u_k}{\|r_L - p_k\|} \quad 0\right]$$

(3.2.3) According to the attenuation rule of the RF signal, the expression of the low-power Bluetooth RSS ranging is as follows:

$$z_k^{BLE} = \left[10^{\frac{R_0 - R_k}{10-b}}\right]^T$$

wherein $R_0$ represents an RSS value measured at a reference point one meter away from a base station, $R_k$ represents an RSS value measured at an epoch k, and b represents a path loss index related to an indoor environment;

the measurement model for low-power Bluetooth RSS ranging is shown as:

$$H_k^R = \left[\frac{E_L - e_k}{\|r_L - p_k\|} \quad \frac{N_L - n_k}{\|r_L - p_k\|} \quad \frac{U_L - u_k}{\|r_L - p_k\|} \quad 0\right]$$

Further, the acoustic measurement compensation and correction comprises:

(3.3.1) Asynchronous Compensation

TDMA allows acoustic signals to be broadcast at non-overlapping time intervals, and furthermore, it makes the TOA detection of pedestrians while walking asynchronous. Therefore, the present disclosure proposes a simplified method to cope with the measurement error of TOA, and by converting the base station positioning in the direction of pedestrian walking speed, the TOA estimated from Base Station (ST) $A_k$ can be kept consistent with the TOA of $STA_{k+1}$;

The converted coordinates $STA'_k$ are expressed as:

$$STA'_k = STA_k + \vec{v}_k \cdot (TOA_i^R - TOA_j^R)$$

wherein $v_k$ represents a pedestrian walking speed, and $TOA_i^R$ and $TOA_j^R$ represent TOA of the reference base station and TOA of the measurement base station respectively;

(3.3.2) Doppler Correction

Based on the Doppler effect, the frequency of the received signal is different from that of the transmitted signal. The Doppler shift $\Delta f$ is expressed as:

$$\Delta f = \frac{f_c}{c}\Delta v_p$$

where $f_c$ and c denote the transmitted signal frequency and the speed of sound, respectively. $\Delta v_p$ represents a projection of a walking speed of a pedestrian on $\vec{P}=\|x_n-STA_k\|$, and $\vec{p}$ represents an axis of a smart phone pointing to the base station;

Therefore, considering the effect of Doppler shift, the compensated TOA measurement TOA'$_k$ is expressed as:

$$TOA'_k = TOA_k + \frac{\Delta f}{F}T$$

wherein F represents a frequency range of the base station, and T represents an acoustic signal period.

Further, the measurement quality evaluation and control includes that:

(3.4.1) based on the typical accuracy and statistical results of the measurement, the duration including the acoustic measurement is defined as reliable update, and the other conditions are general update, and the expression is as follows:

$$\Theta_k = \begin{cases} H_k\hat{x}_k - z_k, & \text{reliable update} \\ H_k\bar{x}_k - z_k, & \text{other conditions} \end{cases}$$

(3.4.2) an adjustment mechanism for the expansion of the variance-covariance matrix is established to reduce unreliable observed values in the state estimation, and the equivalent variance-covariance matrix $\bar{R}_k$ is expressed as:

$$\bar{R}_k = \Lambda_k \times R_k$$

wherein $\Lambda_k$ represents a variance expansion matrix of epoch k;

(3.4.3) in order to determine the magnitude of the expansion, a residual vector is selected to evaluate and control the quality of the measurement, an innovation vector is used for a general update, and the variance expansion factor $\lambda_{ij}$ is an element of $\Lambda_k$, expressed as:

$$\lambda_{ii} = \begin{cases} 1 & |v_i| \le k_0 \\ \frac{k_1 - |v_i|}{k_1 - k_0} & k_0 < |v_i| \le k_1, \lambda_{ij} = \sqrt{\lambda_{ii}\lambda_{jj}} \\ 0 & |v_i| > k_1 \end{cases}$$

where $k_0$ and $k_1$ are constants, taking $k_0=1.0$, $k_1=4.5$. $v_i$ indicates $\Theta_k$ of the observed value $z_{k_i}$, $|v_i|/\sigma_{ii}$ represents the standard residual corresponding to $v_i$.

An adaptive robust combined fusion platform based on a Kalman filter framework using the above-mentioned method, wherein a position vector $[e_k \; n_k \; u_k]$ and a difference angle $\alpha_k$ in a northeast sky coordinate are used as states of a system for positioning and tracking;

$$x_k = [e_k n_k u_k \alpha_k]^T$$

A system state transition matrix is:

$$\Phi_k = \begin{bmatrix} 1 & 0 & 0 & (v_n^{pdr}\cdot\cos(\alpha_{k-1}) - v_e^{pdr}\cdot\sin(\alpha_{k-1}))\cdot\Delta t \\ 0 & 1 & 0 & (-v_n^{pdr}\cdot\sin(\alpha_{k-1}) - v_e^{pdr}\cdot\cos(\alpha_{k-1}))\cdot\Delta t \\ 0 & 0 & 1 & v_u^{pdr}\cdot\Delta t \\ 0 & 0 & 0 & 1 \end{bmatrix}$$

wherein $[v_e^{pdr} \; v_n^{pdr} \; v_u^{pdr}]$ represents a three-dimensional pedestrian walking speed vector calculated by interpolating PDR relative step number points.

Another object of the present disclosure is to provide a system for wide-area acoustic indoor positioning based on RF enhancement implementing the method for wide-area acoustic indoor positioning based on RF enhancement, the system comprising:

a plurality of acoustic base stations, the acoustic base stations comprising a micro control unit (MCU), an acoustic power amplifier (APA), an acoustic codec (AC), a loudspeaker, a wireless synchronization module and a BLE module;

a user terminal, the user terminal integrating a plurality of sensors, including a BLE Bluetooth module, a microphone, an accelerometer, a gyroscope, a barometer, etc., at present, consumer-grade smart phones all containing these sensors, and therefore the system being capable of being used without making any changes to existing smart phone hardware;

a hybrid multiple-access transmission module used for using a limited acoustic bandwidth to identify and distinguish sufficient acoustic signals from an acoustic signal level and an overall system level, and combining three multiple-access schemes of time, space and frequency to assist a small number of BLE signals so as to construct a wide-area coverage capability of an acoustic positioning signal;

an acoustic measurement module used for performing TOA estimation on an acoustic signal based on RF enhancement and area identification based on a low-power Bluetooth RSS;

a robust fusion positioning module of multi-source heterogeneous measurement inertial sensor and multi-source measurement, used for pedestrian walking speed estimation, multi-source heterogeneous measurement, acoustic measurement compensation and correction, measurement quality evaluation and control.

Another object of the present disclosure is to provide a computer device comprising a memory and a processor, the memory storing a computer program which, when executed by the processor, causes the processor to perform the steps of the method for wide-area acoustic indoor positioning based on RF enhancement.

Another object of the present disclosure is to provide a computer readable storage medium storing a computer program which, when executed by a processor, causes the processor to perform the steps of the method for wide-area acoustic indoor positioning based on RF enhancement.

Another object of the present disclosure is to provide an information data processing terminal for implementing the system for wide-area acoustic indoor positioning based on RF enhancement.

By combining the above-mentioned technical solution and the technical problem to be solved, the claimed technical solution of the present disclosure has the following advantages and positive effects.

In order to achieve accurate acoustic signal detection in typical wide-area scenes, a two-step TOA estimation method based on short-time Fourier transform and enhanced cross-correlation is proposed.

The acoustic signal hybrid transmission scheme provided by the present disclosure recognizes and distinguishes enough acoustic signals in the limited acoustic bandwidth of a smart phone, and designs and builds a mixed broadcasting architecture of space, time and frequency division multiple access based on acoustic signals starting from a wide-area coverage application, so as to form a low-cost and scalable acoustic signal coverage capability.

The present disclosure develops a powerful integrated platform and associated positioning algorithms for consumer-level smart phone positioning that closely couples heterogeneous observation data from acoustic signals, BLE signals, and low-cost inertial sensors. In addition, a measurement quality evaluation and control strategy is established to evaluate the quality of each observation datum in real time before it is fed into the adaptive filter.

The indoor positioning technology of smart phones based on acoustic signal provided by the present disclosure has the characteristics of low cost, high accuracy and good compatibility, which is beneficial to form an indoor scheme with wide coverage, high accuracy and low cost.

The expected profit and commercial value after the conversion of the technical solution of the present disclosure are that the technical solution of the present disclosure provides a new possibility for an indoor positioning application based on a consumer-grade smart phone, which can be applied to a large complex, an exhibition centre, a transportation hub and the like in a general amount of indoor space.

Whether the technical solution of the present disclosure solves the technical problem that people have been eager to solve but have never succeeded: acoustic positioning technology is a low-cost, high-precision positioning technology with good compatibility. Existing acoustic-based positioning schemes and systems can achieve room-level positioning coverage, but it is difficult to meet the large-scale, multi-area indoor positioning requirements. The present disclosure can achieve wide-area coverage of acoustic positioning signals through a hybrid multiple access transmission scheme with limited acoustic bandwidth.

DETAILED DESCRIPTION OF THE EMBODIMENTS

In order that the objects, technical solutions and advantages of the present disclosure will become more apparent, a more particular description of the disclosure will be rendered by reference to specific embodiments thereof. It should be understood that the particular embodiments described herein are illustrative only and are not limiting to the present disclosure.

In order for those skilled in the art to fully understand how the disclosure may be embodied, this section is an illustrative embodiment that expands on the claimed technical solutions.

Figure 1:
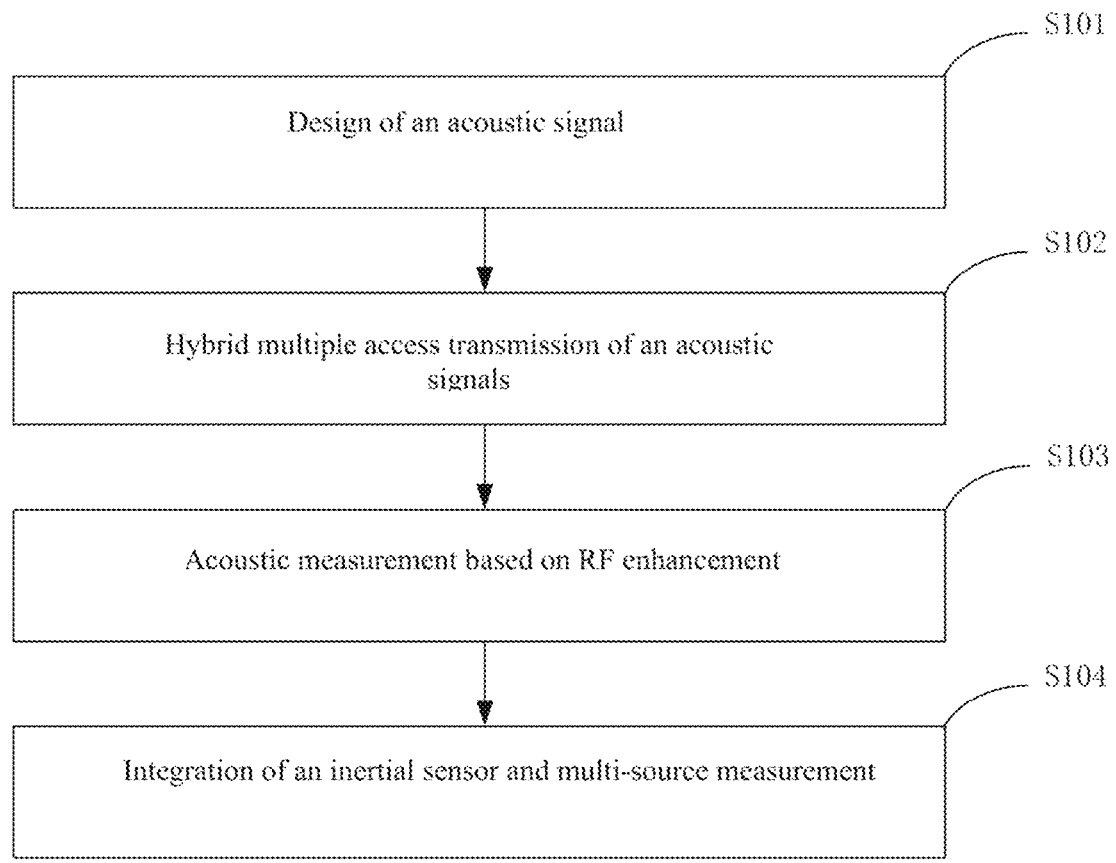
FIG. 1 is a flow chart of a method for wide-area acoustic indoor positioning based on RF enhancement provided by an embodiment of the present disclosure.

As shown in FIG. 1, a method for wide-area acoustic indoor positioning based on RF enhancement provided by an embodiment of the present disclosure comprises:

S101, design of an acoustic signal;
S102, hybrid multiple access transmission of an acoustic signal;
S103, acoustic measurement based on RF enhancement;
S104, robust fusion positioning of an inertial sensor and multi-source measurement.

Further, the frequency $f_0$ of the acoustic signal of step 1 is selected in the range of 12 kHz~23 kHz, and the expression is:

$$s(t) = e^{j2\pi\left(f_0 t + \frac{1}{2}k_0 t^2\right)}, t \in [0, T]$$

the modulation rate $k_0$ and the signal period T being respectively set as 100 kHz/s and 50 ms;

furthermore, in order to reduce effect of the microphone diaphragm inertia, a Blackman window function being used to control an amplitude of an acoustic signal entering and leaving a channel, the expression of the Blackman window function being:

$$w(a) = \begin{cases} 0.42 - 0.5\cos\left(\frac{2\pi}{M-1}\right) + 0.08\cos\left(\frac{4\pi a}{M-1}\right), & 0 \le a \le M-1 \\ 0, & \text{other conditions} \end{cases}$$

a denoting a number of samples and M denoting a window length.

Figure 2:
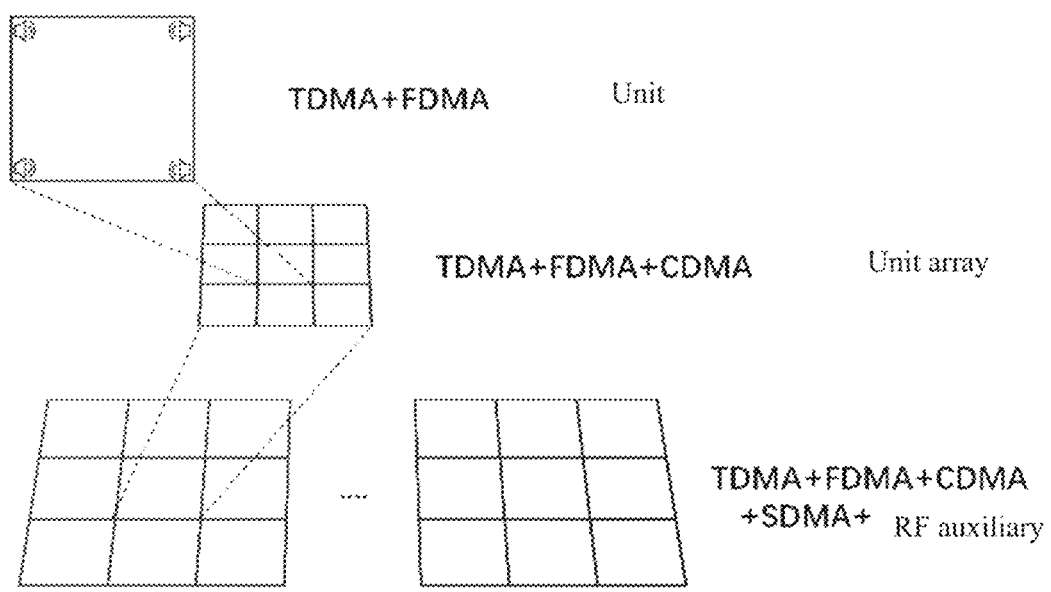
FIG. 2 is a schematic diagram of a hybrid transmission scheme provided by an embodiment of the present disclosure.
Figure 3:
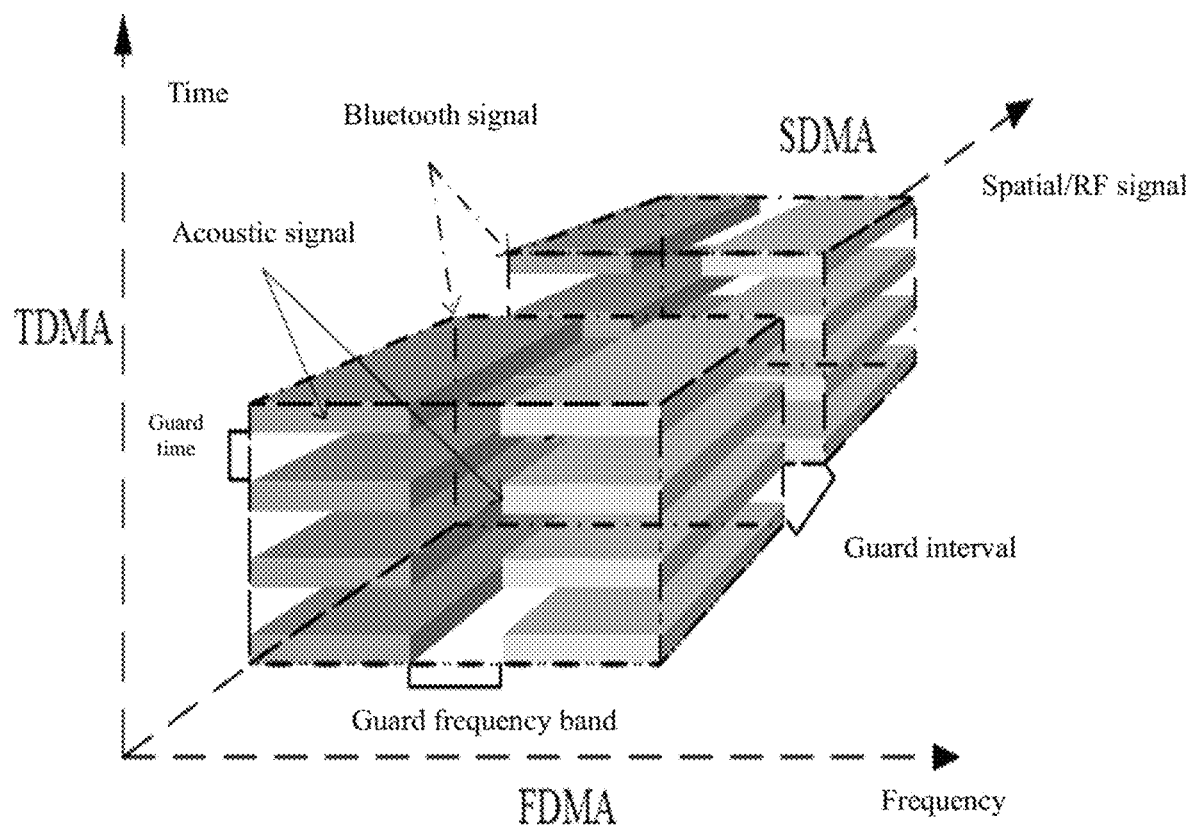
FIG. 3 is a schematic diagram of a hybrid multiple access strategy provided by an embodiment of the present disclosure.

Further, the hybrid multiple access transmission of step 2 utilizes a limited acoustic bandwidth, as shown in FIG. 2 and FIG. 3, to identify and distinguish enough acoustic signals from the acoustic signal level and the overall system level. Combining three multiple access schemes of time, space and frequency, assisting a small amount of BLE signals, and constructing a wide-area coverage capability of an acoustic positioning signal comprise:

(1.1) based on the acoustic broadcasting frameworks of TDMA and FDMA, realizing an independent acoustic positioning unit by alternately broadcasting signals of different frequency bands in time;

(1.2) on the basis of joint calculation of the time of arrival and encoding/decoding of an acoustic signal, implementing broadcasting frameworks of TDMA and FDMA, and a reproducible positioning unit array being formed by a plurality of acoustic positioning units;

(1.3) with spacial isolation and in combination with BLE signal, realizing the expansion of unit array, and constructing the broadcasting frameworks of TDMA, FDMA and SDMA, so as to realize wide-area coverage.

Further, the FDMA is provided with two independent frequency bands and a specific guard frequency interval and each acoustic base station is assigned with a respective operating frequency band. In the embodiments of the present disclosure, two frequency bands are respectively set, one being a guard frequency interval of 12 kHz~13.5 kHz and 14.5 kHz 16 kHz, and 1 kHz, the other being a guard frequency interval of 16.5 kHz 19 kHz and 20 kHz 22.5 kHz, and 1 kHz;

the TDMA uses acoustic base stations of the same frequency band to perform time sharing in a non-overlapping interval;

the guard interval time and period are determined by the coverage area. In the embodiment of the present disclosure, 150 ms and 1000 ms are set respectively;

the SDMA performs multiplexing by spatially separating identical acoustic base stations, and distinguishes same by the acoustic base stations broadcasting Bluetooth information.

Further, the acoustic measurement based on RF enhancement of step 3 comprises a TOA estimation of an acoustic signal and area identification based on low-power Bluetooth RSS.

Further, the TOA estimation of the acoustic signal comprises:

(2.1) presence detection;

(2.2) fine time measurement;

step (2.1) specifically comprises that:

(2.1.1) a local spectrum of s(t) is calculated by adding a window function $\gamma(t)$ to a signal in a time domain.

$$STFT_S(t, f) = \int_{-\infty}^{\infty} [s(t')\gamma^*(t' - t)]\exp(-j2\pi f t')dt'$$

(2.1.2) the time-frequency matrix $\Psi(F, T)$ is rotated for $\theta=\arctan(k_0)$, and the transformed time-frequency matrix $\Psi_\theta(F', T')$ is expressed as:

$$\Psi_\theta(F',T')=T_\theta \times \Psi(F,T)$$

(2.1.3) the statistical magnitude $\Pi(F'_n)$ of energy accumulation is expressed as:

$$\Pi(F'_n)=\Sigma_{(n,m)}\Psi_\theta(F'_n,T'_m)$$

$\Psi_\theta(F'_n, T'_m)$ representing the transformed time-frequency matrix of n rows and m columns.

According to the threshold method, an existence time of acoustic signal is detected:

$$\begin{cases} \Delta\Pi(F'_n) < \min(\Delta\Pi(F'_{n-1}), \Delta\Pi(F'_{n+1})) \\ |\Delta\Pi(F'_n)| \geq \gamma_{\Delta\Pi} \end{cases}$$

$\Delta\Pi(F'_n)$ representing a change of $\Pi(F')$, Yan representing a detection threshold, $\Delta\Pi(F'_{n-1})$ representing a change of $\Pi(F'_{n-1})$, and $\Delta\Pi(F'_{n+1})$ representing a change of $\Pi(F'_{n+1})$.

(2.1.4) The time of arrival $\hat{t}_p$ of the signal is obtained by inverse rotation transformation of the angle $\theta$.

step (2.2) specifically comprises that:

(2.2.1) the filtered acoustic signal $x'_p(t)$ is obtained according to the time of arrival $\hat{\tau}_p$ of the signal, and the cross-correlation (CC) with the reference signal s(t) is calculated:

$$r_{xs}(\tau)=E[x'_p(t)s(t)]$$

(2.2.2) the maximum value of CC function $r_{xs}(\tau)$ is taken as the initial time, and the first peak is inversely searched according to the threshold method with the following expression:

$$\hat{\tau}_0=\min\{|r_{xs}(\hat{\tau}_n)| \geq \alpha \max[|r_{xs}(\tau)|]\}$$

wherein $\alpha$ represents a threshold coefficient and $\alpha=0.3$ is taken.

Further, the area identification based on low-power Bluetooth RSS comprises:

distinguishing the Bluetooth signal broadcast by a Bluetooth module carried by an acoustic base station deployed by each unit in a unit array to distinguish the unit array, and based on a spatial distribution and a propagation rule of the Bluetooth RF signal, establishing a weighting matrix of a Bluetooth update frequency and a signal strength:

$$\prod(r) = \frac{1}{\eta}\begin{bmatrix} \eta_{1,1}(\tilde{y}_{1,1}-\gamma) & \eta_{1,2}(\tilde{y}_{1,2}-\gamma) & \cdots & \eta_{1,m}(\tilde{y}_{1,m}-\gamma) \\ \eta_{2,1}(\tilde{y}_{2,1}-\gamma) & \eta_{2,2}(\tilde{y}_{2,2}-\gamma) & \cdots & \eta_{2,m}(\tilde{y}_{2,m}-\gamma) \\ \vdots & \vdots & \cdots & \vdots \\ \eta_{n,m}(\tilde{y}_{n,1}-\gamma) & \eta_{n,m}(\tilde{y}_{n,2}-\gamma) & \cdots & \eta_{n,m}(\tilde{y}_{n,m}-\gamma) \end{bmatrix}$$

where $\eta_{n,m}$ represents the number of RF signals scanned by each unit, $\eta$ is a total number of RF signals scanned at the current moment, $\tilde{\gamma}_{n,m}$ is an average value of RSS in the sliding window, and $\gamma$ is a system configuration parameter (the recommended setting is 100-120).

The corresponding unit array with the highest comprehensive weighted value R is calculated to distinguish the current area:

$$R=\arg\max(\Pi(r))$$

Further, the robust fusion positioning of the inertial sensor and the multi-source measurement of the step 4 comprises pedestrian walking speed estimation, multi-source heterogeneous measurement, acoustic measurement compensation and correction, measurement quality evaluation and control.

The present disclosure proposes an adaptive robust combined fusion platform based on the Kalman filter framework, wherein the position vector $[e_k\ n_k\ u_k]$ and the difference angle $\alpha_k$ in the northeast sky coordinate are used as the states of the system for positioning and tracking:

$$x_k=[e_k n_k u_k \alpha_k]^T$$

The system state transition matrix is:

$$\Phi_k = \begin{bmatrix} 1 & 0 & 0 & (v_n^{pdr}\cdot\cos(\alpha_{k-1})-v_e^{pdr}\cdot\sin(\alpha_{k-1}))\cdot\Delta t \\ 0 & 1 & 0 & (-v_n^{pdr}\cdot\sin(\alpha_{k-1})-v_e^{pdr}\cdot\cos(\alpha_{k-1}))\cdot\Delta t \\ 0 & 0 & 1 & v_u^{pdr}\cdot\Delta t \\ 0 & 0 & 0 & 1 \end{bmatrix}$$

$[v_e^{pdr}\ v_n^{pdr}\ v_u^{pdr}]$ representing a three-dimensional pedestrian walking speed vector calculated by interpolating PDR relative step points;

Further, the pedestrian walking speed estimation includes that: the two-dimensional pedestrian walking speed is estimated by interpolating relative step frequency points, and the pedestrian walking speed estimation is expressed as follows:

$$\begin{cases} v_{x,k} = SL_k \cdot SF_k \cdot \cos\left(\Psi_{k-1} + \frac{1}{2}\Delta\Psi_k\right) \\ v_{y,k} = SL_k \cdot SF_k \cdot \sin\left(\Psi_{k-1} + \frac{1}{2}\Delta\Psi_k\right) \end{cases}$$

where $SL_k$ and $SF_k$ denote the step size and the step frequency at step k, respectively, and $\Psi_k$ and $\Delta\Psi_k$ denote heading (azimuth) and the change in heading, respectively.

Further, the multi-source heterogeneous measurement comprises that:

(3.2.1) the double base station TDOA measurement expression $z_k^{TDOA}$ is as follows.

$$z_k^{TDOA} = [c \times TDOA_{i,j}]^T$$
$$= [c \times (TOA_i^R - TOA_j^R + (i-j)*\Gamma)]^T, i \geq j$$

wherein c represents a propagation speed of an acoustic signal, R represents a current area, $\Gamma$ represents a guard time, i represents a base station of no. i, and j represents a base station of no. j.

By using Taylor extension and ignoring higher order errors, the acoustic TDOA measurement model is shown as:

$$H_k^{TDOA} = \left[ \frac{E_L - e_k}{\|r_L - \hat{x}_k\|} - \frac{E_{L-1} - e_k}{\|r_{L-1} - \hat{x}_k\|} \quad \frac{N_L - n_k}{\|r_L - \hat{x}_k\|} - \frac{N_{L-1} - n_k}{\|r_{L-1} - \hat{x}_k\|} \quad \frac{U_L - u_k}{\|r_L - \hat{x}_k\|} - \frac{U_{L-1} - u_k}{\|r_{L-1} - \hat{x}_k\|} \quad 0 \right]$$

wherein $r_L = [E_L\ N_L\ U_L]$ represents a position vector of the Lth base station, $r_{L-1} = [E_{L-1}\ N_{L-1}\ U_{L-1}]$ represents a position vector of the (L−1)th base station, and $P_k = [e_k\ n_k\ u_k]$ represents a position predicted by the system in the epoch k;

(3.2.2) a single base station relative ranging expression $z_k^{RR}$ is as follows:

$$z_k^{RR} = [c \times (TOA_k^L - TOA_{k-1}^L - \Theta) + \|r_L - \hat{x}_{k-1}\|]^T$$

where $\Theta$ is a period of the TDMA, determined by a coverage area, and the present disclosure takes $\Theta = 1000$ ms.

Similarly, the measurement model for single base station relative ranging is shown as:

$$H_k^{RT} = \left[ \frac{E_L - e_k}{\|r_L - p_k\|} \quad \frac{N_L - n_k}{\|r_L - p_k\|} \quad \frac{U_L - u_k}{\|r_L - p_k\|} \quad 0 \right]$$

(3.2.3) According to the attenuation rule of the RF signal, the expression of the low-power Bluetooth RSS ranging is as follows:

$$z_k^{BLE} = \left[ 10^{\frac{R_0 - R_k}{10 - b}} \right]^T$$

wherein $R_0$ represents an RSS value measured at a reference point one meter away from a base station, $R_k$ represents an RSS value measured at an epoch k, and b represents a path loss index related to an indoor environment;

the measurement model for low-power Bluetooth RSS ranging is shown as:

$$H_k^R = \left[ \frac{E_L - e_k}{\|r_L - p_k\|} \quad \frac{N_L - n_k}{\|r_L - p_k\|} \quad \frac{U_L - u_k}{\|r_L - p_k\|} \quad 0 \right]$$

Further, the acoustic measurement compensation and correction comprises:

(3.3.1) Asynchronous Compensation

Figure 4:
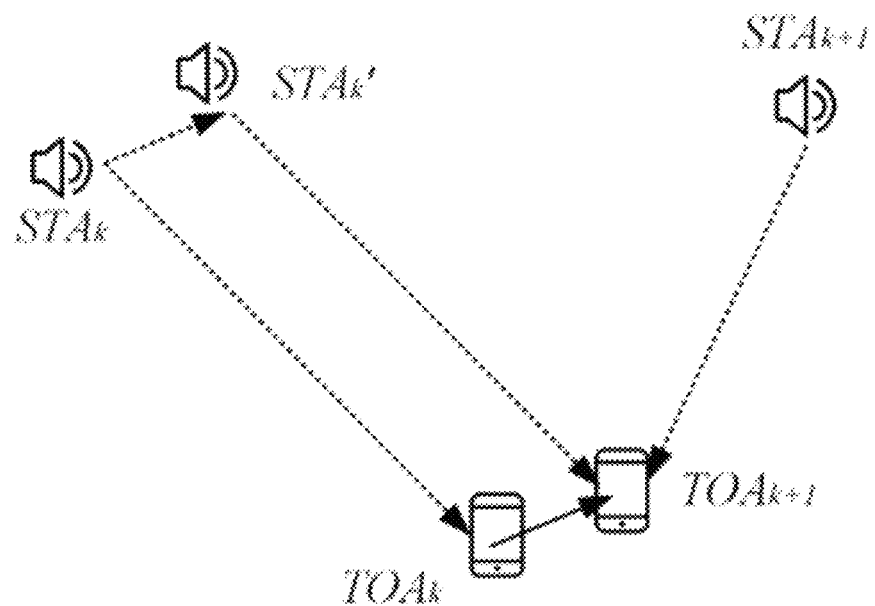
FIG. 4 is a schematic diagram of asynchronous compensation of acoustic measurements provided by an embodiment of the present disclosure.

TDMA allows acoustic signals to be broadcast at non-overlapping time intervals, and furthermore, it makes the TOA detection of pedestrians while walking asynchronous. Therefore, the present disclosure proposes a simplified method to cope with the TOA measurement error, and as shown in FIG. 4, by converting the base station positioning in the direction of pedestrian walking speed, the TOA estimated from $STA_k$ can be kept consistent with the TOA of $STA_{k+1}$;

The converted coordinates $STA'_k$ are expressed as:

$$STA'_k = STA_k + \vec{v}_k \cdot (TOA_i^R - TOA_j^R)$$

wherein $\vec{v}_k$ represents a pedestrian walking speed, and $TOA_i^R$ and $TOA_j^R$ represent TOA of the reference base station and TOA of the measurement base station respectively;

(3.3.2) Doppler Correction

Figure 5:
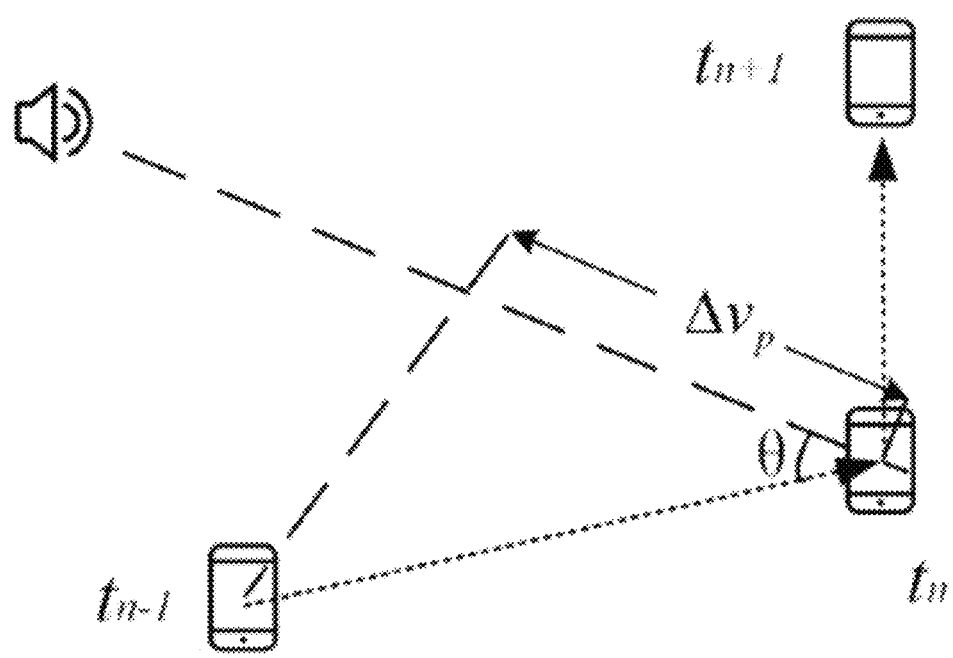
FIG. 5 is a schematic diagram of Doppler correction of an acoustic measurement provided by an embodiment of the present disclosure.
Figure 6:
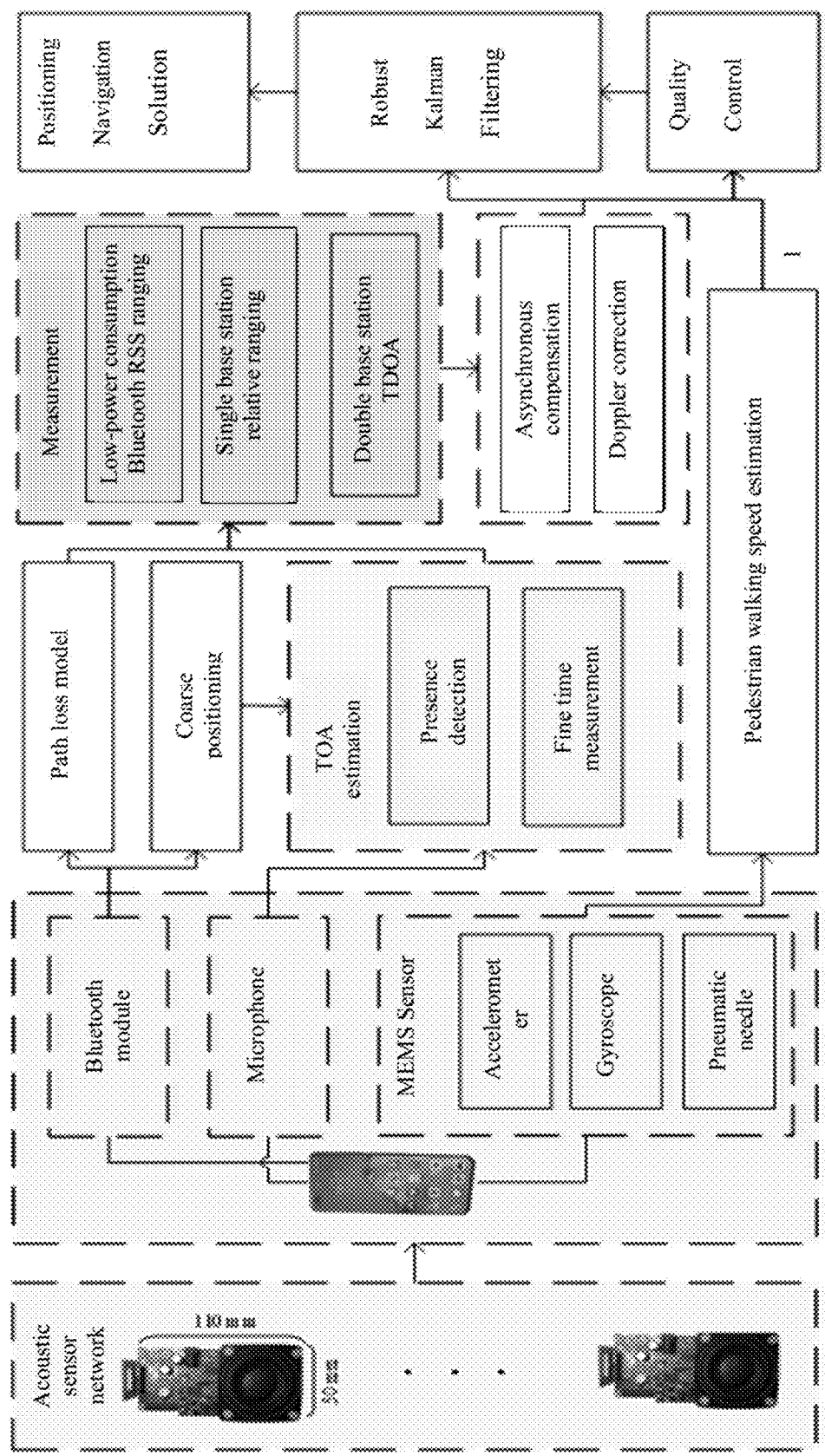
FIG. 6 is a flow chart of a system for wide-area acoustic indoor positioning based on RF enhancement provided by an embodiment of the present disclosure.

Based on the Doppler effect, the frequency of the received signal is different from that of the transmitted signal. The Doppler shift $\Delta f$ is expressed as:

$$\Delta f = \frac{f_c}{c} \Delta v_p$$

where $f_c$ and c denote the transmitted signal frequency and the speed of sound, respectively. As shown in FIG. 5, $\Delta v_p$ represents a projection of a walking speed of a pedestrian on $\vec{p} = \|x_n - STA_k\|$, and $\vec{p}$ represents an axis of a smart phone pointing to the base station;

Therefore, considering the effect of Doppler shift, the compensated TOA measurement $TOA'_k$ is expressed as:

$$TOA'_k = TOA_k + \frac{\Delta f}{F} T$$

wherein F represents a frequency range of the base station, and T represents an acoustic signal period.

Further, the measurement quality evaluation and control includes that:

(3.4.1) based on the typical accuracy and statistical results of the measurement, the duration including the acoustic measurement is defined as reliable update, and the other conditions are general update, and the expression is as follows:

$$\Theta_k = \begin{cases} H_k \hat{x}_k - z_k, & \text{reliable update} \\ H_k \bar{x}_k - z_k, & \text{other conditions} \end{cases}$$

(3.4.2) an adjustment mechanism for the expansion of the variance-covariance matrix is established to reduce unreliable observed values in the state estimation, and the equivalent variance-covariance matrix $\overline{R}_k$ is expressed as:

$$\overline{R}_k = \Lambda_k \times R_k$$

wherein $\Lambda_k$ represents a variance expansion matrix of epoch k;

(3.4.3) in order to determine the magnitude of the expansion, a residual vector is selected to evaluate and control the quality of the measurement, an innovation vector is used for a general update, and the variance expansion factor $\lambda_{ij}$ is an element of $\Lambda_k$, expressed as:

$$\lambda_{ii} = \begin{cases} 1 & |v_i| \le k_0 \\ \dfrac{k_1 - |v_i|}{k_1 - k_0} & k_0 < |v_i| \le k_1, \lambda_{ij} = \sqrt{\lambda_{ii}\lambda_{jj}} \\ 0 & |v_i| > k_1 \end{cases}$$

where $k_0$ and $k_1$ are constants, taking $k_0=1.0$, $k_1=4.5$. $v_i$ indicates $\Theta_k$ of the observed value $z_{k_i}$, $|v_i/\sigma_{ii}|$ represents the standard residual corresponding to $v_i$.

An embodiment of the present disclosure further provides a system for wide-area acoustic indoor positioning based on RF enhancement implementing the method for wide-area acoustic indoor positioning based on RF enhancement, the system comprising:

- a plurality of acoustic base stations, the acoustic base stations comprising a micro control unit (MCU), an acoustic power amplifier (APA), an acoustic codec (AC), a loudspeaker, a wireless synchronization module and a BLE module;
- a user terminal, the user terminal integrating a plurality of sensors, including a BLE Bluetooth module, a microphone, an accelerometer, a gyroscope, a barometer, etc., at present, consumer-grade smart phones all containing these sensors, and therefore the system being capable of being used without making any changes to existing smart phone hardware;
- a hybrid multiple-access transmission module used for using a limited acoustic bandwidth to identify and distinguish sufficient acoustic signals from an acoustic signal level and an overall system level, and combining three multiple-access schemes of time, space and frequency to assist a small number of BLE signals so as to construct a wide-area coverage capability of an acoustic positioning signal;
- an acoustic measurement module used for performing TOA estimation on an acoustic signal based on RF enhancement and area identification based on a Bluetooth RSS with low-power consumption;
- a robust fusion positioning module of inertial sensor and multi-source measurement, used for pedestrian walking speed estimation, multi-source heterogeneous measurement, acoustic measurement compensation and correction, measurement quality evaluation and control.

In order to prove the inventive step and technical value of the technical solution of the present disclosure, this part is an application embodiment of the technical solution of the claims on specific products or related technologies.

The present disclosure evaluates the performance of the proposed method and system in wide-area indoor scenes by performing static ranging experiments and positioning performance experiments in laboratory scenes and typical indoor scenes, respectively.

Static ranging experiments were performed at the National Optoelectronic Rangefinder Calibration Center. In this experiment, Huawei Honor 8 and P9 Plus are used, the detection range is 1.9 m~37 m, and the ground real value is measured by dual-frequency laser interferometer (HP5529B).

Figure 7:
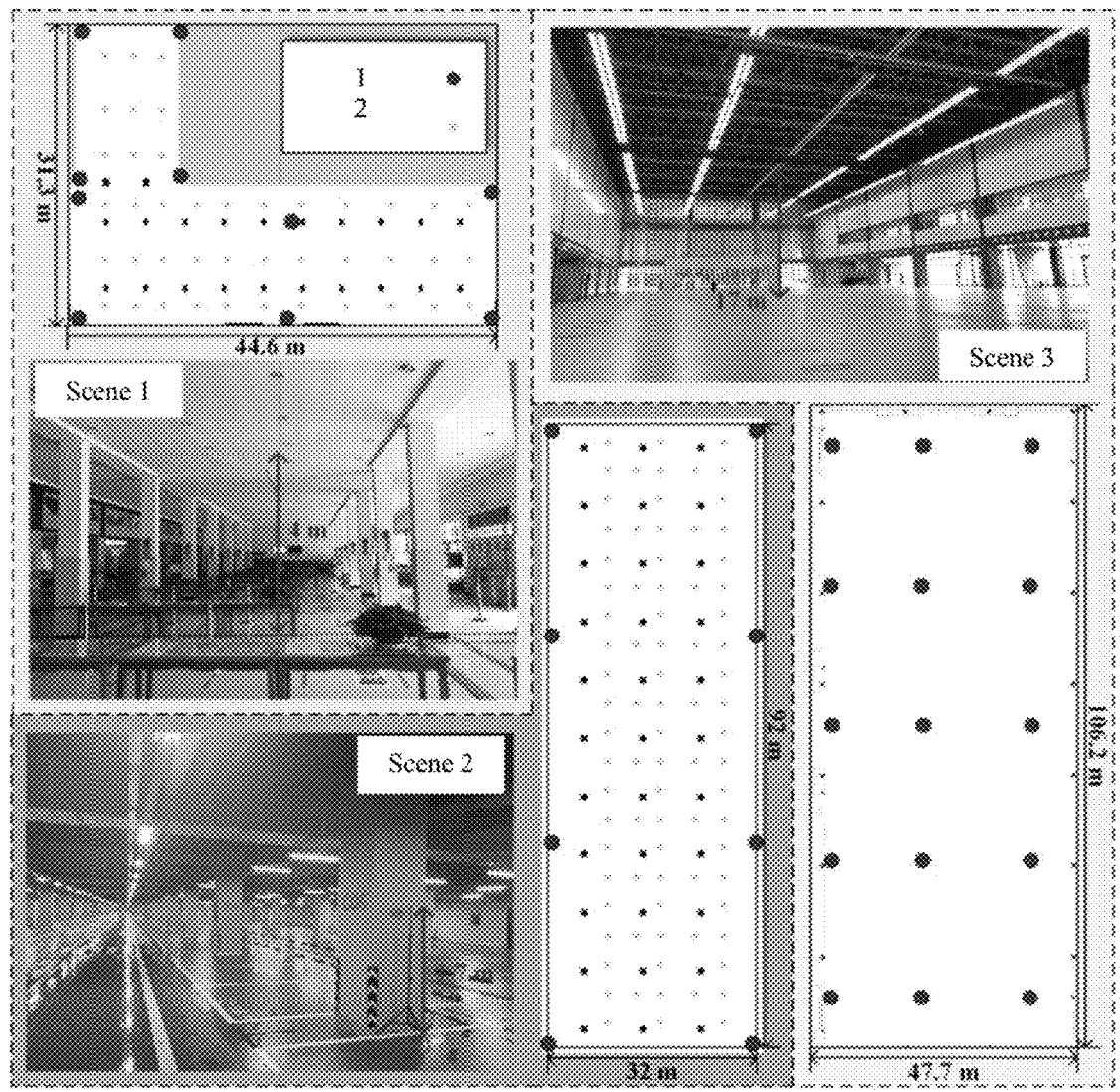
FIG. 7 is a diagram of an experimental scene provided by an embodiment of the present disclosure.

The positioning performance experiments were carried out in three typical indoor scenes, as shown in FIG. 7. Scene 1 is a college student dining hall (31.3 m×44.6 m×4 m); scene 2 is a basement parking lot of Suzhou sports center (32 m×92 m×3.8 m), and scene 3 is an exhibition hall of Deqing exhibition center (47.7 m×106.2 m×17 m).

The positioning performance experiments are divided into static positioning performance experiments and dynamic positioning performance experiments.

Static positioning experiments were performed under scene 1 and scene 2, respectively, as shown in FIG. 7, where the coordinates of black solid points (test points) were measured by Leica total station TS60, using Huawei mate9, Honor 8, P9 Plus, and google Pixel 3.

Dynamic positioning experiments were performed under scene 1, scene 2 and scene 3, respectively, and the positioning method of the present disclosure was compared with the positioning results of least square method (TRI), standard Kalman filter (SKF), traceless Kalman filtering (UKF) and particle filtering (PF). Huawei mate9, Tongyao 8, P9 Plus, google Pixel 3 and Xiaomi 10 were used in this experiment.

Embodiments of the present disclosure achieve some positive results in their development or use, and indeed provide significant advantages over the prior art, and are described below in connection with experimental process data, charts, etc.

The embodiments of she present disclosure evaluated the following performances:

1) Static Ranging Performance

Figure 8:
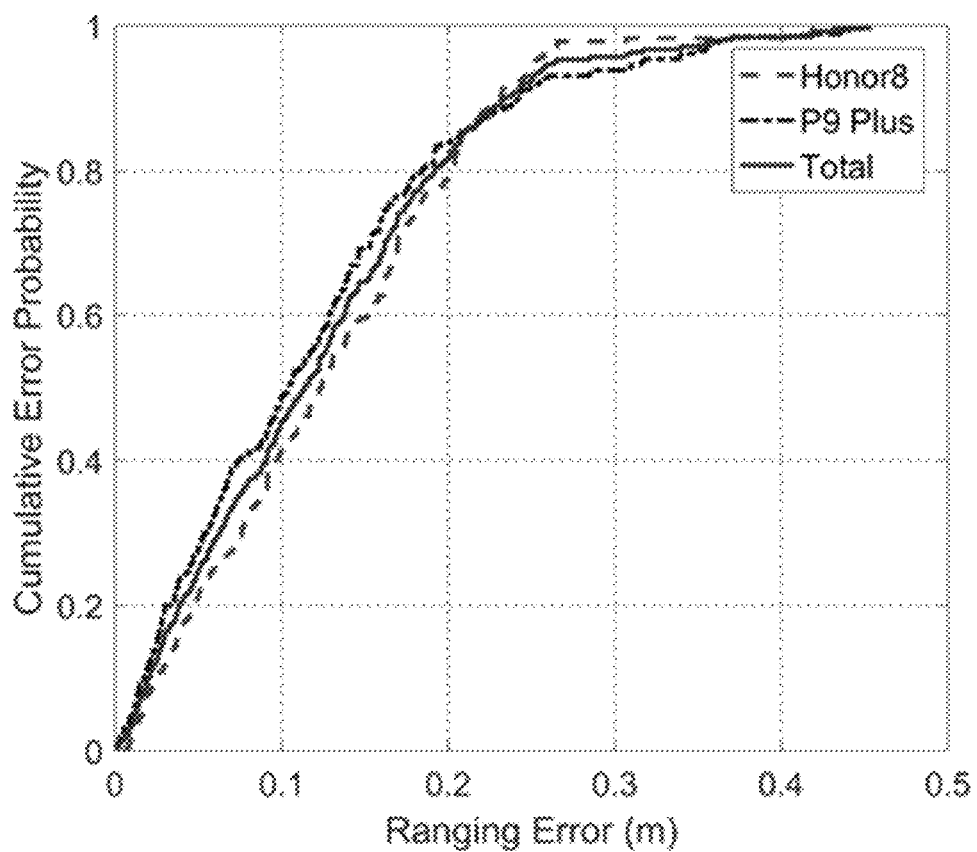
FIG. 8 is a schematic diagram of cumulative percentage error results of ranging provided by an embodiment of the present disclosure.

FIG. 8 shows the cumulative percent error for the ranging experiment. The 50%, 95% and maximum ranging errors for the system of the present disclosure are 0.114 m, 0.138 m and 0.453 m, respectively. The average ranging errors of Huawei Honor 8, P9 Plus and all data are 0.119 m, 0.128 m and 0.123 m, respectively. The difference between the ranging performance of the two tested smartphones is very small, i.e. less than 8%.

2) Static Positioning Performance

Figure 9:
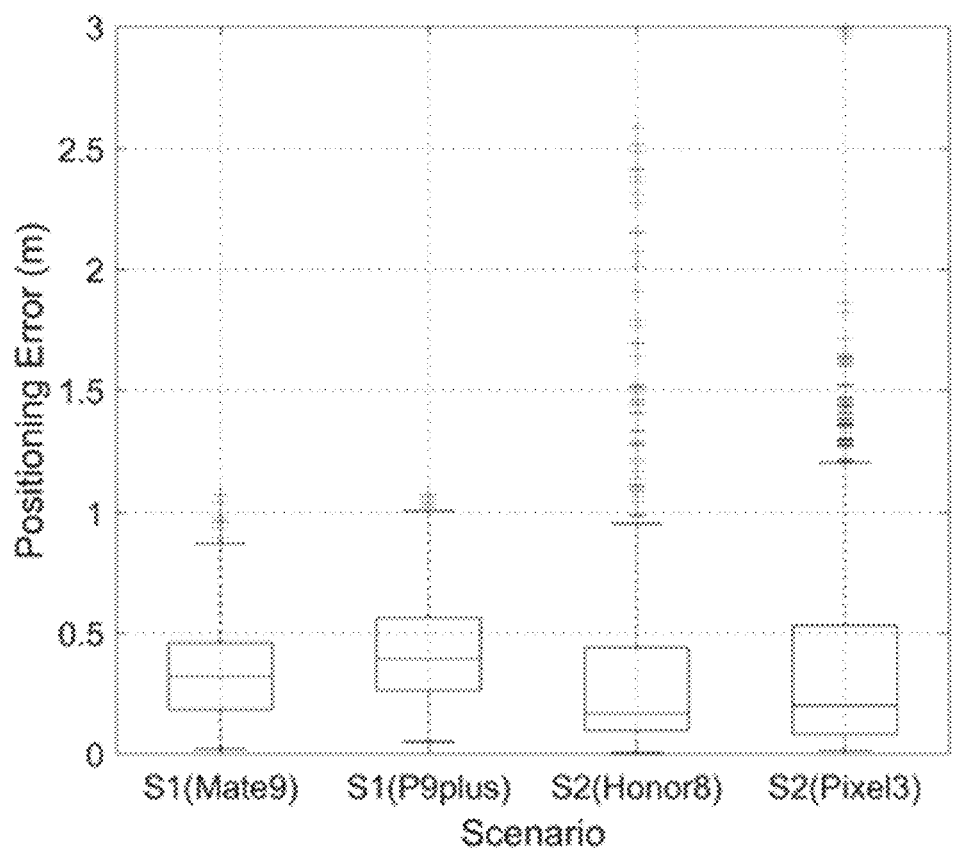
FIG. 9 is static positioning error statistic results provided by an embodiment of the present disclosure.

FIG. 9 shows static positioning error statistics for four sets of experiments, including maximum, minimum, lower quartile, upper quartile, median and outlier. In scene 1, the positioning error of Mate9 is 0.017 m~1.072 m, and the 50% error is 0.322 m; the positioning error of P9 Plus is 0.047 m~1.076 m, and the 50% error is 0.393 m. In scene 2, the positioning error of Honor 8 is 0.001 m~2.584 m, and the 50% error is 0.168 m; the positioning error of Pixel3 is 0.012 m~4.239 m, 50% error is 0.200 m. See Table 1 for specific data.

3) Dynamic Positioning Performance

Figure 10:
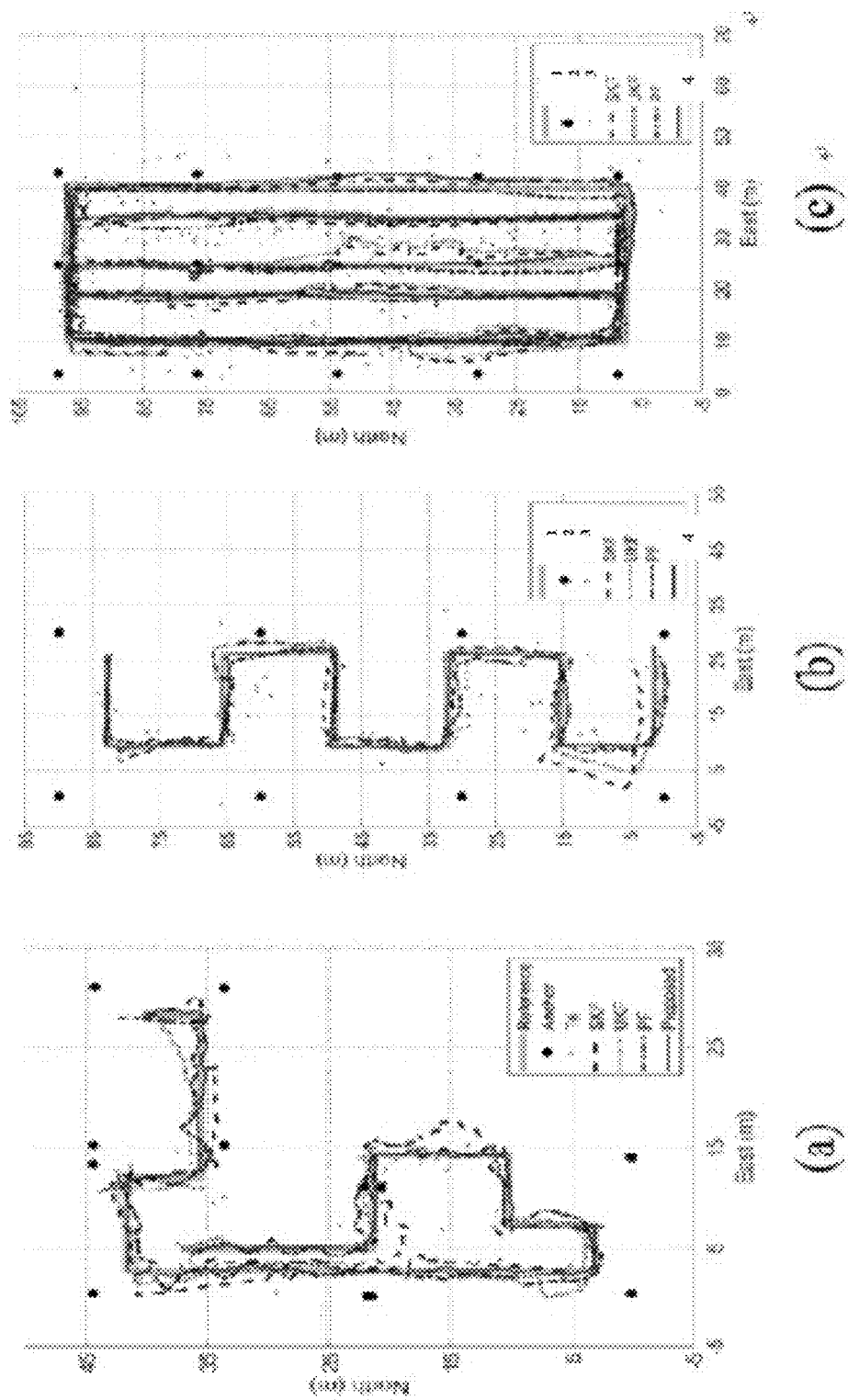
FIG. 10 is a dynamic positioning trajectory under different scenes provided by an embodiment of the present disclosure, (a) scene 1, (b) scene 2 and (c) scene 3.

FIG. 10 shows the positioning results of test traces for three typical wide-area indoor scenes. The trajectory results show that the least squares method cannot provide a continuous and accurate position, while the proposed positioning method of the present disclosure presents a smoother and closer result to the reference trajectory. The number of acoustic observations and the measurement errors increase when at border positions connecting multiple zones, resulting in deviations of all trajectories. In contrary, the considerable accuracy of the position estimation is maintained due to the measurement quality evaluation and control in the positioning method proposed by the present disclosure.

Figure 11:
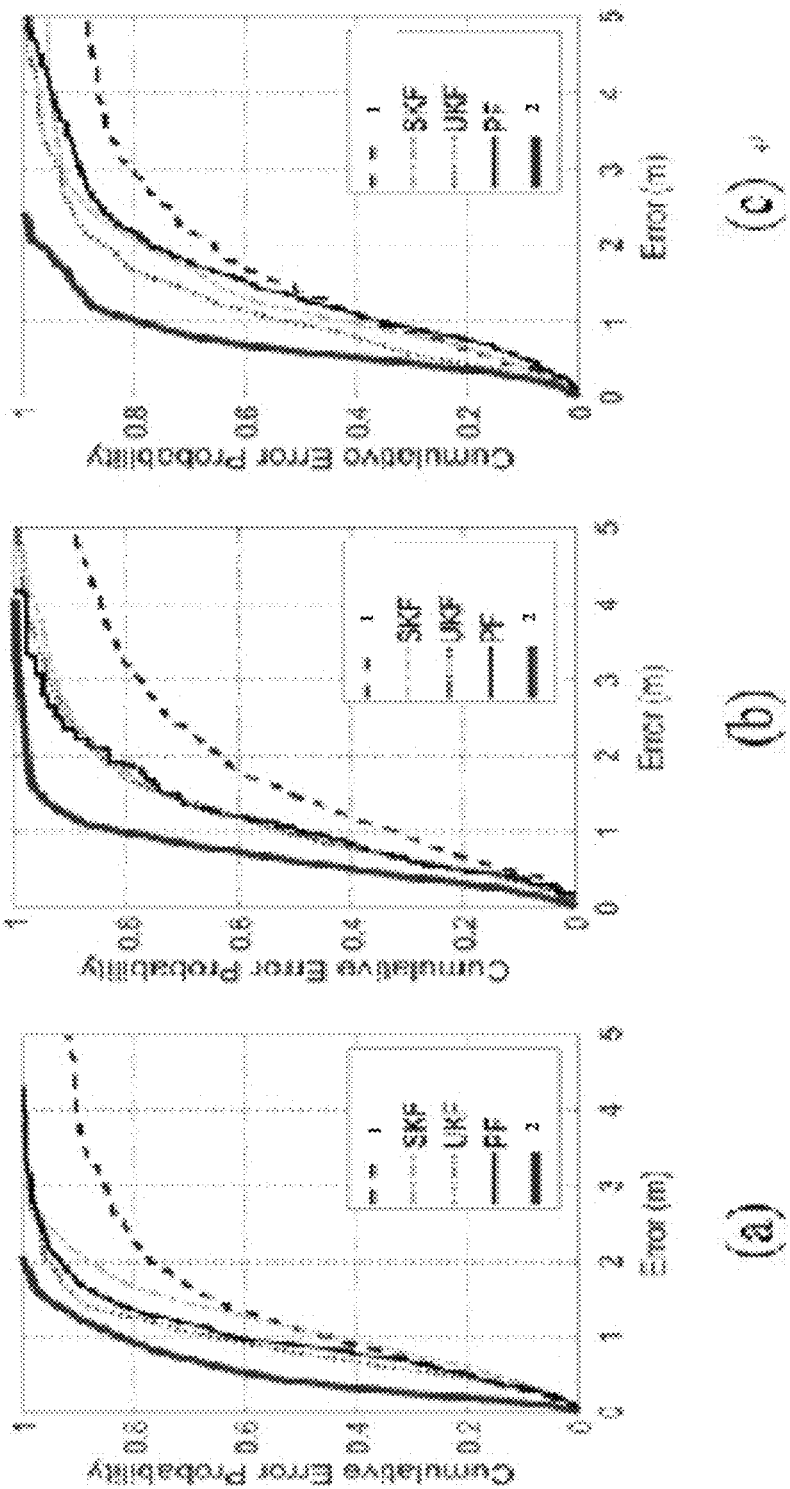
FIG. 11 is a schematic diagram of the cumulative percent error of dynamic positioning errors for different scenes, (a) scene 1, (b) scene 2, and (c) scene 3, provided by an embodiment of the present disclosure.

FIG. 11 shows the cumulative percent error for the dynamic positioning test. In scene 1, the 50%, 95% and maximum errors of the system of the present disclosure were 0.400 m, 1.483 m and 2.083 m, respectively. In scene 2, the 50%, 95% and maximum errors of the system of the present disclosure were 0.595 m, 1.870 m and 2.415 m, respectively, and in scene 3, the 50%, 95% and maximum errors of the system of the present disclosure were 0.617 m, 1.454 m and 4.072 m, respectively. The results show that the system of the present disclosure performs best with an average positioning error of 0.674 m. Compared with the fusion algorithm, the system of the present disclosure improves the positioning accuracy by 41.44%~47.59% and reduces the invariance by 70.48%~78.24%.

Table 2 lists the positioning performance of different smart phones in different wide-area scenes for the system of the present disclosure. The results show that there is no significant difference in positioning, and all the devices achieved stable sub-meter accuracy. By combining the results of static ranging and positioning, it is found that the accuracy difference caused by microphone hardware of smart phone is relatively small. FIG. 10 also shows that the performance of the PDR algorithm may depend on the specific MEMS sensor hardware. However, the method of the present disclosure effectively performs the $\alpha_k$ estimation task, reducing the impact of offset of the smart phone's zero point on positioning accuracy.

TABLE 2

Comparison of Dynamic Positioning Errors

| Statistics (m) | scene 1 | | | scene 2 | | | scene 3 | |
|---|---|---|---|---|---|---|---|---|
| | Mate9 | P9 Plus | Honor8 | Pixel 3 | Honor 8 | Xiaomi 10 | P9 Plus | Honor 8 |
| Average error | 0.631 | 0.569 | 0.481 | 0.681 | 0.777 | 0.809 | 0.766 | 0.631 |
| 95% error | 1.471 | 1.758 | 1.223 | 1.666 | 2.002 | 1.798 | 1.527 | 1.431 |
| Maximum error | 1.811 | 2.083 | 1.714 | 2.303 | 2.415 | 2.689 | 4.072 | 3.268 |

In summary, experimental results show that the positioning method of the present disclosure achieves an average positioning accuracy of 0.34 m (static) and 0.67 m (dynamic). The overall performance, repeatability and stability are excellent for different scenes and devices. In contrast to existing acoustic positioning schemes, the system of the present disclosure enables sub-micron positioning in typical wide-area indoor scenes, such as conference centers, parking lots, and canteen halls. This has a significant impact on potential indoor positioning services and applications.

It should be noted that embodiments of the present disclosure may be implemented in hardware, software, or a combination of hardware and software. The hardware part may be implemented using dedicated logic; the software component may be stored in a memory and executed by a suitable instruction execution system, such as a microprocessor or dedicated design hardware. Those skilled in the art will appreciate that the apparatus and methods described above may be implemented using computer-executable instructions and/or embodied in processor control code, for example, provided on a carrier medium such as a disk, CD or DVD-ROM, programmable memory such as read-only memory (firmware), or a data carrier such as an optical or electronic signal carrier. The device of the present disclosure and its modules may be implemented by hardware circuits such as very large scale integrated circuits or gate arrays, semiconductors such as logic chips, transistors, etc. or programmable hardware devices such as field programmable gate arrays, programmable logic devices, etc. by software executed by various types of processors, or by a combination of the above-mentioned hardware circuits and software, e.g. firmware.

The foregoing is only the detailed embodiments of the present disclosure, but the scope of protection of the present disclosure is not limited thereto. Various modifications, equivalent substitutions, and improvements made by those skilled in the art within the technical scope of the present disclosure, without departing from the spirit and principle of the present disclosure, shall be covered by the scope of protection of the present disclosure.

What is claimed is:

1. A method for wide-area acoustic indoor positioning based on RF enhancement, comprising:

step 1, designing of an acoustic signal;

step 2, performing hybrid multiple access transmission of the acoustic signal, wherein a step of hybrid multiple access transmission of the acoustic signal comprises utilizing a limited acoustic bandwidth to identify and distinguish enough acoustic signals from an acoustic signal level and an overall system level, combining three multiple access schemes of time, space and frequency, and assisting a small amount of Bluetooth Low Energy (BLE) signals;

step 3, performing acoustic measurement based on Radio Frequency (RF)_enhancement that comprises an area identification based on short-time Fourier transform (STFT) and low-power Bluetooth received signal strength (RSS) detecting an existence of the acoustic signal, and obtaining an accurate time of arrival (TOA) of the acoustic signal according to filtered acoustic data and an approximate TOA, so as to realize an acoustic ranging based on smart phones;

step 4, obtaining a time difference of arrival (TDOA) result by multi-source heterogeneous measurement, performing asynchronous compensation and Doppler correction evaluating and controlling a measurement quality, finally, in combination with pedestrian speed estimation, realizing acoustic positioning based on smart phones, wherein 1) the multi-source heterogeneous measurement comprising:

a double base station TDOA measurement expression $z_k^{TDOA}$ being as follows:

$$z_k^{TDOA} = [c \times TDOA_{i,j}]^T = [c \times (TOA_i^R - TOA_j^R + (i-j) * \Gamma)]^T, i \geq j$$

wherein c represents a propagation speed of the acoustic signal, R represents a current area, $\Gamma$ represents a guard time, i represents a base station of no. i, and j represents a base station of no. j;

by using Taylor extension on the double base station TDOA measurement expression $z_k^{TDOA}$ and ignoring higher order errors, an acoustic TDOA measurement model being shown as:

$$H_k^{TDOA} = \left[ \frac{E_L - e_k}{\|r_L - \hat{x}_k\|} - \frac{E_{L-1} - e_k}{\|r_{L-1} - \hat{x}_k\|} \quad \frac{N_L - n_k}{\|r_L - \hat{x}_k\|} - \frac{N_{L-1} - n_k}{\|r_{L-1} - \hat{x}_k\|} \quad \frac{U_L - u_k}{\|r_L - \hat{x}_k\|} - \frac{U_{L-1} - u_k}{\|r_{L-1} - \hat{x}_k\|} \quad 0 \right]$$

wherein $r_L = [E_L \ N_L \ U_L]$ represents a position vector of $L^{th}$ base station, $r_{L-1} = [E_{L-1} \ N_{L-1} \ U_{L-1}]$ represents a position vector of the $(L-1)^{th}$ base station, and $P_k = [e_k \ n_k \ u_k]$ represents a position predicted by a system in an epoch k;

a single base station relative ranging expression $z_k^{RR}$ being as follows:

$$z_k^{RR} = [c \times (TOA_k^L - TOA_{k-1}^L - \Theta) + \|r_L - \hat{x}_{k-1}\|]^T$$

where $\Theta$ is a period of Time Division Multiple Access (TDMA), determined by a coverage area, and takes wherein $\Theta = 1000$ ms;

a measurement model for a single base station relative ranging being shown as:

$$H_k^{RT} = \left[ \frac{E_L - e_k}{\|r_L - p_k\|} \quad \frac{N_L - n_k}{\|r_L - p_k\|} \quad \frac{U_L - u_k}{\|r_L - p_k\|} \quad 0 \right]$$

according to an attenuation rule of a RF signal, an expression of low-power Bluetooth RSS ranging being as follows:

$$z_k^{BLE} = \left[ 10^{\frac{R_0 - R_k}{10-b}} \right]^T$$

wherein $R_0$ represents an RSS value measured at a reference point one meter away from a base station, $R_k$ represents an RSS value measured at the epoch k, and b represents a path loss index related to an indoor environment;

a measurement model for the low-power Bluetooth RSS ranging being shown as:

$$H_k^R = \left[ \frac{E_L - e_k}{\|r_L - p_k\|} \quad \frac{N_L - n_k}{\|r_L - p_k\|} \quad \frac{U_L - u_k}{\|r_L - p_k\|} \quad 0 \right]$$

2) an acoustic measurement compensation and correction comprising:

the asynchronous compensation: by converting a base station positioning in a direction of the pedestrian walking speed, the TOA estimated from $STA_k$ being kept consistent with the TOA of $STA_{k+1}$;

converted coordinates $STA'_k$ being expressed as:

$$STA'_k = STA_k + \vec{v}_k \cdot (TOA_i^R - TOA_j^R)$$

wherein $\vec{v}_k$ represents the pedestrian walking speed, and $TOA_i^R$ and $TOA_j^R$ represent TOA of a reference base station and TOA of the measurement base station respectively;

the Doppler correction: based on the Doppler effect, a frequency of a received signal being different from that of a transmitted signal, a Doppler shift $\Delta f$ being expressed as:

$$\Delta f = \frac{f_c}{c} \Delta v_p$$

where $f_c$ and c denote a transmitted signal frequency and a speed of sound, respectively, $\Delta v_p$ represents a projection of a walking speed of a pedestrian on $\vec{p} = \|x_n - STA_k\|$, and $\vec{p}$ represents an axis of a smart phone pointing to the base station;

a compensated TOA measurement $TOA'_k$ being expressed as:

$$TOA'_k = TOA_k + \frac{\Delta f}{F} T$$

wherein F represents a frequency range of the base station, and T represents an acoustic signal period, 3) the measurement quality evaluation and control including:

based on typical accuracy and statistical results of the measurement, a duration including the acoustic measurement being defined as reliable update, and other conditions being general update, and an expression being as follows:

$$\Theta_k = \begin{cases} H_k \hat{x}_k - z_k, & \text{reliable update} \\ H_k \bar{x}_k - z_k, & \text{other conditions} \end{cases}$$

an adjustment mechanism for an expansion of a variance-covariance matrix being established, and an equivalent variance-covariance matrix $R_k$ being expressed as:

$$\bar{R}_k = \Lambda_k \times R_k$$

wherein $\Lambda_k$ represents the variance expansion matrix of epoch k;

in order to determine a magnitude of the expansion, a residual vector being selected to evaluate and control the quality of the measurement, an innovation vector being used for a general update, and a variance expansion factor $\lambda_{ij}$ being an element of $\Lambda_k$, expressed as:

$$\lambda_{ii} = \begin{cases} 1 & |v_i| \leq k_0 \\ \frac{k_1 - |v_i|}{k_1 - k_0} & k_0 < |v_i| \leq k_1, \lambda_{ij} = \sqrt{\lambda_{ii} \lambda_{jj}} \\ 0 & |v_i| > k_1 \end{cases}$$

where $k_0$ and $k_1$ are constants, taking $k_0 = 1.0$, $k_1 = 4.5$, $v_i$ indicates $\Theta_k$ of the observed value $z_{k_i}$, $|v_i/\sigma_{ii}|$ represents a standard residual corresponding to $v_i$;

4) the pedestrian walking speed estimation including that: a two-dimensional pedestrian walking speed is estimated by interpolating relative step frequency points, and the pedestrian walking speed estimation is expressed as follows:

$$\begin{cases} v_{x,k} = SL_k \cdot SF_k \cdot \cos\left(\Psi_{k-1} + \frac{1}{2}\Delta\Psi_k\right) \\ v_{y,k} = SL_k \cdot SF_k \cdot \sin\left(\Psi_{k-1} + \frac{1}{2}\Delta\Psi_k\right) \end{cases}$$

where $SL_k$ and $SF_k$ denote a step size and a step frequency at step k, respectively, and $\Psi_k$ and $\Delta\Psi_k$ denote heading (azimuth) and a change in heading, respectively;

a frequency $f_0$ of the acoustic signal of the step 1 being selected in the range of 12 kHz~23 kHz, and an expression being:

$$s(t) = e^{j2\pi(f_0 t + \frac{1}{2}k_0 t^2)}, t \in [0, T]$$

a modulation rate $k_0$ and the acoustic signal period T being respectively set as 100 kHz/s and 50 ms;

wherein, a Blackman window function being used to control an amplitude of the acoustic signal entering and leaving a channel, expression of the Blackman window function being:

$$w(a) = \begin{cases} 0.42 - 0.5\cos\left(\frac{2\pi}{M-1}\right) + 0.08\cos\left(\frac{4\pi a}{M-1}\right), & 0 \leq a \leq M-1 \\ 0, & \text{other conditions} \end{cases}$$

a denoting a number of samples and M denoting a window length;

the hybrid multiple access transmission of the step 2 comprising:

(1.1) based on acoustic broadcasting frameworks of TDMA and frequency division multiple access (FDMA), realizing an independent acoustic positioning unit by alternately broadcasting signals of different frequency bands in time;

(1.2) on the basis of joint calculation of the time of arrival and encoding/decoding of the acoustic signal, implementing broadcasting frameworks of TDMA and FDMA, and a reproducible positioning unit array being formed by a plurality of acoustic positioning units;

(1.3) with spacial isolation and in combination with BLE signal, realizing the expansion of unit array, and constructing the broadcasting frameworks of TDMA, FDMA and spatial division multiple access (SDMA), so as to realize wide-area coverage.

2. The method for wide-area acoustic indoor positioning based on RF enhancement according to claim 1, wherein the FDMA sets two independent frequency bands and a specific guard frequency interval, and allocates a respective working frequency band to each acoustic base station;

the TDMA uses acoustic base stations of same frequency band to perform time sharing in a non-overlapping interval;

a guard interval time and period are determined by a coverage area;

the SDMA performs multiplexing by spatially separating identical acoustic base stations, and distinguishes same by the acoustic base stations broadcasting Bluetooth information.

3. The method for wide-area acoustic indoor positioning based on RF enhancement according to claim 1, wherein the TOA estimation of the acoustic signal comprises:

(2.1) presence detection;
(2.2) fine time measurement;
and step (2.1) specifically comprises:
(2.1.1) a local spectrum of s(t) being calculated by adding a window function $\gamma(t)$ to a signal in $$STFT_s(t, f) = \int_{-\infty}^{\infty} [s(t')\gamma^*(t'-t)]\exp(-j2\pi f t')dt'$$

(2.1.2) a time-frequency matrix $\Psi(F, T)$ being rotated by angle $\theta = \arctan(k_0)$, and a transformed time-frequency matrix $\Psi_\theta(F', T')$ being expressed as:

$\Psi_\theta(F',T') = T_\theta \times \Psi(F,T)$ (2.1.3) a statistical magnitude$\Pi(F'_n)$ of energy accumulation being expressed as:

$\Pi(F'_n) = \Sigma_{(n,m)} \Psi_\theta(F'_n, T'_m)$ $\Psi_\theta(F'_n, T'_m)$ representing the transformed time-frequency matrix of n rows and m columns;

according to a threshold method, an existence time of the acoustic signal being detected:

$$\begin{cases} \Delta\Pi(F'_n) < \min(\Delta\Pi(F'_{n-1}), \Delta\Pi(F'_{n+1})) \\ |\Delta\Pi(F'_n)| \geq \gamma_{\Delta\Pi} \end{cases}$$

$\Delta\Pi(F'_n)$ representing a change of $\Pi(F'_n)$, $\gamma_{\Delta\Pi}$ representing a detection threshold, $\Delta\Pi(F'_{n-1})$ representing a change of $\Pi(F'_{n-1})$, and $\Delta\Pi(F'_{n+1})$ representing a change of $\Pi(F'_{n+1})$;

(2.1.4) the time of arrival $f_p$ of the signal being obtained by inverse rotation transformation of the angle $\theta$;

step (2.2) specifically comprises that:

(2.2.1) a filtered acoustic signal $x'_p(t)$ being obtained according to the time of arrival $\hat{\tau}_p$ of the signal, and a cross-correlation (CC) with the reference signal s(t) being calculated:

$r_{xs}(\tau) = E[x'_p(t)s(t)]$ (2.2.2) a maximum value of a CC function $r_{xs}(\tau)$ being taken as an initial time, and a first peak being inversely searched using $\hat{\tau}_0$ according to the threshold method with the following expression:

$\hat{\tau}_0 = \min\{|r_{xs}(\hat{\tau}_n)| \geq \alpha \max[|r_{xs}(\tau)|]\}$ wherein $\alpha$ represents a threshold coefficient and $\alpha = 0.3$ is taken.

4. The method for wide-area acoustic indoor positioning based on RF enhancement according to claim 1, wherein the area identification based on the low-power Bluetooth RSS comprises:

utilizing a Bluetooth signal broadcast by a Bluetooth module carried by an acoustic base station deployed by each unit in a unit array to distinguish the unit array, and based on a spatial distribution and a propagation rule of the Bluetooth RF signal, establishing a weighting matrix of a Bluetooth update frequency and a signal strength:

$$\prod(r) = \frac{1}{\eta}\begin{bmatrix} \eta_{1,1}(\tilde{\gamma}_{1,1} - \gamma) & \eta_{1,2}(\tilde{\gamma}_{1,2} - \gamma) & \cdots & \eta_{1,m}(\tilde{\gamma}_{1,m} - \gamma) \\ \eta_{2,1}(\tilde{\gamma}_{2,1} - \gamma) & \eta_{2,2}(\tilde{\gamma}_{2,2} - \gamma) & \cdots & \eta_{2,m}(\tilde{\gamma}_{2,m} - \gamma) \\ \vdots & \vdots & \cdots & \vdots \\ \eta_{n,m}(\tilde{\gamma}_{n,1} - \gamma) & \eta_{n,m}(\tilde{\gamma}_{n,2} - \gamma) & \cdots & \eta_{n,m}(\tilde{\gamma}_{n,m} - \gamma) \end{bmatrix}$$

where $\eta_{n,m}$ represents a number of RF signals scanned by each unit, $\eta$ is a total number of RF signals scanned at a current moment, $\tilde{\gamma}_{n,m}$ is an average value of RSS in a sliding window, and $\gamma$ is a system configuration parameter;

a corresponding unit array with the highest comprehensive weighted value R being calculated to distinguish the current area:

$R = \arg\max(\Pi(r))$.

5. An adaptive robust combined fusion platform based on a Kalman filter framework using the method according to claim 1, wherein a position vector $[e_k\ n_k\ u_k]$ and a difference angle $\alpha_k$ in a northeast sky coordinate are used as states of a system for positioning and tracking:

$x_k = [e_k n_k u_k \alpha_k]^T$ a system state transition matrix is:

$$\Phi_k = \begin{bmatrix} 1 & 0 & 0 & (v_n^{pdr} \cdot \cos(\alpha_{k-1}) - v_e^{pdr} \cdot \sin(\alpha_{k-1})) \cdot \Delta t \\ 0 & 1 & 0 & (-v_n^{pdr} - \sin(\alpha_{k-1}) - v_e^{pdr} \cdot \cos(\alpha_{k-1})) \cdot \Delta t \\ 0 & 0 & 1 & v_u^{pdr} \cdot \Delta t \\ 0 & 0 & 0 & 1 \end{bmatrix}$$

$[v_e^{pdr}\ v_n^{pdr}\ v_u^{pdr}]$ representing a three-dimensional pedestrian walking speed vector calculated by interpolating PDR relative step number points.

6. A system for wide-area acoustic indoor positioning based on RF enhancement implementing the method for wide-area acoustic indoor positioning based on RF enhancement according to claim 1, the system for wide-area acoustic indoor positioning based on RF enhancement comprising:

a plurality of acoustic base stations, the acoustic base stations comprising a micro control unit MCU, an acoustic power amplifier (APA), an acoustic codec (AC), a loudspeaker, a wireless synchronization module and a BLE module;

a user terminal, the user terminal integrating a plurality of sensors, including a BLE Bluetooth module, a microphone, an accelerometer, a gyroscope, a barometer;

a hybrid multiple-access transmission module used for using a limited acoustic bandwidth to identify and distinguish sufficient acoustic signals from an acoustic signal level and an overall system level, and combining three multiple-access schemes of time, space and frequency to assist a small number of BLE signals so as to construct a wide-area coverage capability of an acoustic positioning signal;

an acoustic measurement module used for performing TOA estimation on an acoustic signal based on RF enhancement and area identification based on a low-power Bluetooth RSS;

a robust fusion positioning module of multi-source heterogeneous measurement inertial sensor and multi-source measurement, used for pedestrian walking speed estimation, multi-source heterogeneous measurement, acoustic measurement compensation and correction, measurement quality evaluation and control.

\* \* \* \* \*